United States Patent Office 2,838,600
Patented June 10, 1958

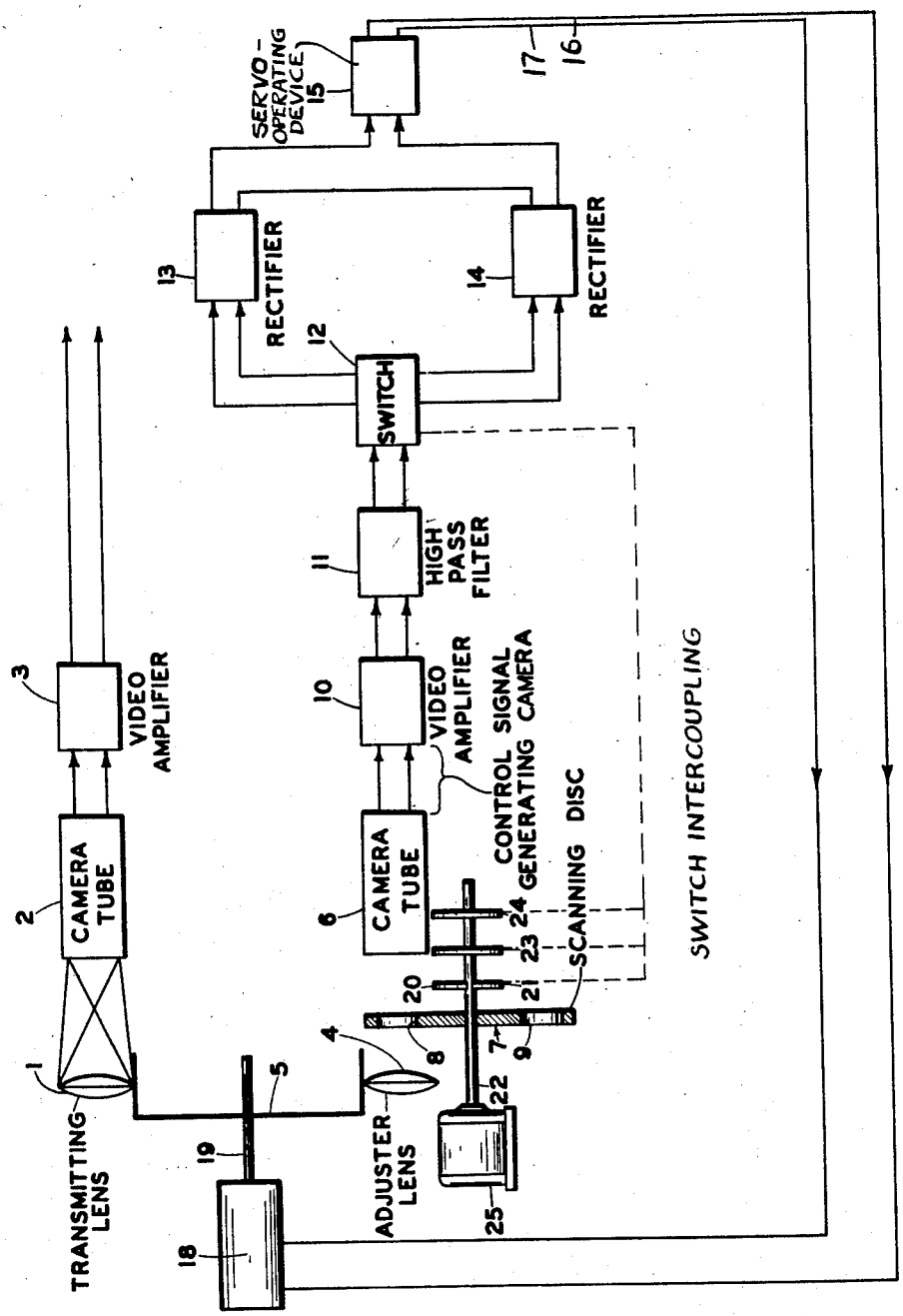

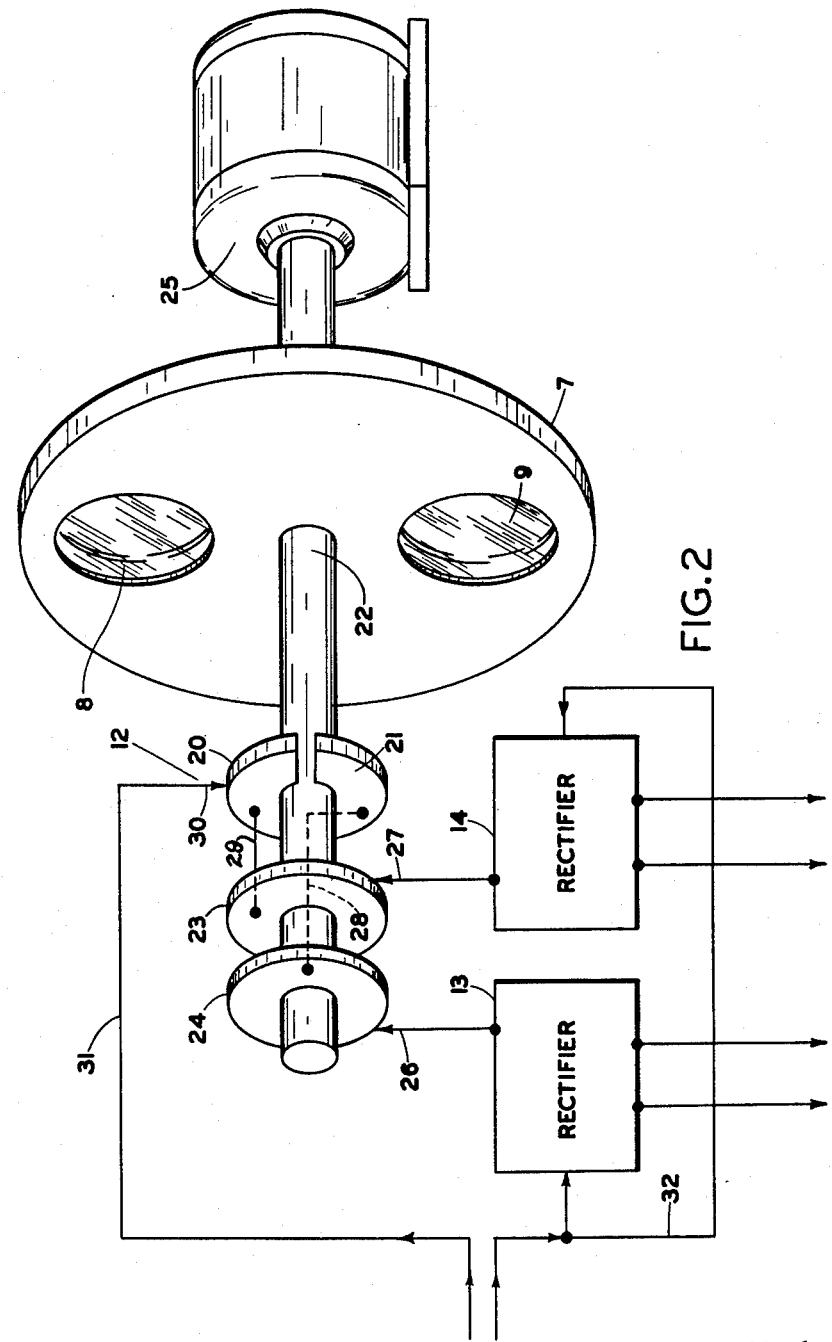

---

2,838,600

FOCUSING ADJUSTING SYSTEM

Hans W. Salinger, Fort Wayne, Ind., assignor to International Telephone and Telegraph Corporation, a corporation of Maryland Application September 22, 1952, Serial No. 310,761

13 Claims. (Cl. 178—7.2)

---

The present invention relates to automatic focusing of optical or electron-optical images and more particularly to an automatic focusing system adaptable to both television and photographic apparatus.

In the art of television and photography it is essential that the subject being viewed be accurately focused upon the light sensitive surface of the camera in order to derive a clear, well defined reproduction. In the past, it has been customary to achieve this focusing by means of adjustments made manually by an operator. In some instances in which the viewed subject moves rapidly with respect to the camera, the operator must keep the subject accurately focused, and it is the problem of maintaining focus in constant, accurate adjustment with which this invention is primarily concerned.

It is, therefore, an object of this invention to provide for camera apparatus a system capable of maintaining optimum focus of an object on the light sensitive surface of the camera whether the subject be moving or stationary.

It is another object of this invention to provide for camera apparatus an automatic focusing device which will adjust automatically for proper focus without the need of operator attention.

It is still another object to provide in light sensitive apparatus an electrical balancing system sensitive to changes in focus of an object being viewed, which is effective to maintain such object in optimum focus at all times.

It is yet another object of this invention to provide a unique and novel automatic focus adjusting device for cameras which utilizes a minimum of equipment, is relatively economical and simple in its construction, and simple in its operation. In accomplishing this object, a single light-sensitive camera tube or the like is used for effecting focusing adjustment of a main camera unit thereby simplifying the problem of design and reducing the element of cost.

Other objects will become apparent as the description proceeds.

The objects of this invention are attained by focusing two camera tubes upon the scene to be transmitted. The image of one tube is cyclically and alternately focused on planes ahead of and to the rear of photo-sensitive cathode of that tube. The frequency of the video signal at the output of a photocathode is inversely proportional to the degree of defocus so that the mean video frequency is a measure of defocus. A frequency sensitive circuit such as a high-pass filter is connected to the output of said one camera tube and a switch is coupled to the output of the filter, which switch is in turn driven in synchronism with the defocusing mechanism to sample the video signal in its two defocused conditions. The two sampled signals are then compared and the difference-signal is applied to a servo-motor for driving the transmitting lens into focus position.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

In the drawings:

Fig. 1 is a diagrammatic illustration in block diagram of an embodiment of this invention incorporated in a television system;

Fig. 2 is a diagrammatic illustration in perspective of a mechanical switching device which may be used in the embodiment of Fig. 1.

The arrangement of this invention illustrated in the drawings and described hereafter is used in conjunction with a television camera, and, as it will become apparent hereafter, the same arrangement may be used in conjunction with motion picture or still camera equipment.

Referring to the drawings, a transmitting lens 1 is mounted to direct an optical image toward the picture signal-generating or camera tube 2, this combination of lens and tube being conventional in the art, with the lens 1 being adjustable with respect to the photo-sensitive cathode of the camera tube 2. This tube may be any of the well known types such as the image dissector, the iconoscope, or the image orthicon. It is conventional in the use of such tubes that an optical image be focused on the photo-sensitive cathode thereof, said image being scanned for producing picture signal energy and amplified by an amplifier, such as the video amplifier 3, which is usually made a part of the television camera unit. The amplified signal is then fed to associated electronic equipment of a conventional nature and transmitted to remote receivers for reproduction.

The remainder of the mechanism illustrated in the drawings and to be described hereafter constitutes the adjusting system for maintaining the transmitting lens 1 in optimum focus with respect to the cathode of the camera tube 2. This adjusting mechanism comprises an adjuster lens 4 laterally offset from the lens 1 and secured thereto by means of a carriage structure or frame 5 movable to effect corresponding movement of both lens members as a unit.

Another camera tube 6, which may be identical to the camera tube 3, or which may be of any of the other camera type tubes mentioned in the foregoing is optically associated with the lens 4, and in one form of this invention, the two tubes 2 and 6 are mounted on a single frame structure to prevent relative movement therebetween. With the lens members 1 and 4 in properly adjusted position, the lens 1 will focus a selected object with optimum definition on the cathode of the tube 2, and the lens 4 will be spaced from the cathode of tube 6 a distance which will produce a focusing condition to be explained hereafter.

A disc or focusing modulator 7 is mounted for rotation about its axis and is interposed between the lens 4 and the tube 6. This modulator 7 is essentially a flat circular plate having two diametrically spaced openings or windows 8 and 9 which are aligned to pass sequentially the light path between the lens 4 and the cathode of the tube 6. As will be seen in Fig. 1, the arrangement is such that as the disc 7 is rotated, the windows 8 and 9 will alternately pass into and out of registeration with the light path of the lens 4.

Now, by filling the openings 8 and 9 with transparent plates having different refraction indices, the optical images alternately falling on the cathode of the tube 6 as the disc 7 is rotated will possess degrees of focused definition depending upon the refractive indices of the plates. Thus, by properly selecting the values of refractive indices, it is possible to project onto the cathode of the camera tube 6 two optical images which are alternately over and under focused by the same amount. While windows of different refractive indices have been specified, it will be understood, of course, that windows made of the same material but having different thicknesses will accomplish the same result of focusing the optical image an equal amount beyond and in front of the tube 6 cathode. Also, obviously, two lenses of different refractive power could be used in place of the specified windows.

With the lens 1 properly adjusted so that its image plane coincides with the cathode of picture tube 2, the arrangement between the lens 4, the modulator 7, and the tube 6 is such that as the disc 7 is rotated, the optical image plane of the lens 4 will be over and under focused equal amounts with respect to cathode of the tube 6.

As in the case of the camera tube 2, a video amplifier 10 is coupled to the output of the tube 6, thereby comprising a control signal-generating camera which serves the purpose to be explained more fully hereafter. Coupled to the video amplifier 10 is a high pass filter 11 which preferably passes signal frequencies only in the two to four megacycle range. The output of this filter 11 is coupled to either an electronic or mechanical switch 12 which alternately operates to couple the filter output signal through to the rectifiers 13 and 15, respectively. In turn, the composite output parameters of these rectifiers are connected to the input of a conventional servo-operating device or comparison circuit 15 which is provided with two alternative, selectable operating positions connected respectively by means of wires 16 and 17 to a reversible servo-motor 18 having its output shaft 19 operatively connected to the lens frame 5. The arrangement between the motor 18 and the lens frame 5 is such that upon energization of the motor 18, the frame and the lenses 1 and 4 will be selectively moved as a unit either to the right or to the left as viewed in Fig. 1.

A mechanical switch or distributing circuit 12 which will operate satisfactorily in the illustrated embodiment is more clearly shown in Fig. 2. This switch may comprise two semi-circular commutator discs 20 and 21 which are insulated from each other and which are mounted on the rotating shaft 22 of the modulator 7. Two other conductive discs 23 and 24, mounted for rotation with the shaft 22 and electrically insulated from each other and from the switch parts 20 and 21, are arranged to rotate with the modulator 7. A motor 25 is used to rotate the shaft 22, the associated disc 7 and the switch part.

A brush or slip contact indicated by the arrow 26, connects the disc 24 to one of the rectifiers such as the rectifier 13. Likewise, another slip contact, indicated by the arrow 27, couples the disc 23 with the rectifier 14. Disc 24 and switch part 21 are connected together by a wire 28 which may pass inside shaft 22, and ring 23 and switch part 20 are connected by a wire 29. Another brush or sliding contact, indicated by the arrow 30, is arranged to have alternate electrical contact with the commutator segments 20 and 21 as the shaft 22 is rotated. One lead 31 of the two lead output circuit of the filter 11 is connected to the slip contact 30, and the other filter output lead is connected to the input circuits of the two rectifiers 13 and 14, respectively, so that by rotation of the shaft 22, the output circuit of this filter 11 will be alternately connected to or switched between these two rectifiers.

This alternate filter output circuit connection to the two rectifiers may be traced as follows. With the shaft 22 in its illustrated position, a connection from the high pass filter 11 will be made through wire 31, slip contact 30, switch part 20, wire 29, disc 23, slip contact 27, rectifier 14, and wire 32. With the shaft 22 rotated through an angle of 180 degrees, the filter output circuit will be connected to the rectifier 13 through wire 31, slip contact 30, switch part 21, wire 28, disc 24, and slip contact 26.

The switch segments 20 and 21 and the focus-controlling windows 8 and 9 of the focus modulator 7 are, respectively, so arranged that when the window 8 is registered with the light path between the lens 4 and the camera tube 6, a circuit will be completed from the high pass filter 11 to the rectifier 14. Likewise, when the window 9 is registered with lens 4, the rectifier 13 will be coupled through to the filter 11.

The servo-operating device 15 is designed to detect and respond to an unbalance or difference between the signal output parameters of the rectifiers 13 and 15, so that if the output signal of rectifier 13 should exceed that of rectifier 14, the servo-operating device will correspondingly operate to cause energization of the servo-motor 18 in one direction. For the reverse rectifier output signal conditions, the servo device 15 will be effective to cause energization of the motor 18 in the opposite direction.

This device 15 may comprise essentially a single pole double throw D. C. relay switch having the two fixed contacts thereof connected to the reversing windings of the motor 18 by means of wires 16 and 17, respectively. The armature contact of the relay is selectively controlled for engagement with one or the other of said fixed contacts by means of two separately energized electro-magnets arranged on opposite sides of the armature whereby energization of one magnet effects closure of the armature contact with one fixed contact, and conversely, energization of the other magnet effects closure of the armature contact with the other fixed contact. The two magnets are coupled to respective ones of the rectifiers 13 and 14. With an unbalance between the magnitudes, for example, of D. C. output voltages of the two rectifiers, the armature will be operated correspondingly in one direction to close one of the circuits (16 or 17) leading to the motor 18.

In the operation of this invention, the lenses 1 and 4 are directed toward the televised subject for projecting the optical image thereof onto the camera tubes 2 and 6, respectively. As explained previously, the image cast by the lens 1 will be focused with optimum clarity upon the cathode of the tube 2, while the image of the lens 4 will be focused by reason of the interposition of the focus modulator 7 alternately in front of and beyond the cathode in the tube 6. If now it is assumed that the televised subject moves toward the lens unit 1, 4, the focusing of the alternate images on the tube 6 will change such that one of the images will improve in focus while the other image will deteriorate. If it is assumed that the window 8 formerly cast an optical image in front of the cathode of the tube 6, it is seen that as the televised subject approaches the lens 4 the image cast by the window 8 will approach more nearly perfect focus on the tube 6 cathode while, conversely, the optical image produced by the window 9 will fall farther behind and produce less optical definition on the cathode of tube 6. With the alternate improved focusing produced by the window 8, more signal energy will be fed to the rectifier 14 during the cycle of registry of this window 8 with lens 4. Correspondingly, less signal will reach rectifier 13 during the focusing cycle of window 9. This is so because the high pass filter 11 passes only the signal frequencies ranging between two and four megacycles, as explained previously, which correspond to the fine detail and, therefore, have greater amplitude now during registration of window 8. The output signal of filter 11 is fed alternately by means of the switch 11, also as explained previously, to the rectifiers 13 and 14 respectively, which in turn serve the servo-operating device 15. The latter will now operate in a direction corresponding to the direction of unbalance between the output signals of the two rectifiers 13 and 14, and make a connection which energizes the servo-motor 18 in a direction to move the lens unit 1, 4 to the left until the focus cycle of the modulator 7 is such as to produce focused optical images equal distances in front of and behind the cathode of the tube 6 and identical signals for the two rectifiers 13 and 14. As explained previously, when the focus or optical image planes directed toward the tube 6 are equalized, lens 1 will be properly focused on the cathode of camera tube 2.

By assuming the opposite conditions, i. e. the televised subject moves away from the lens unit 1, 4, focusing occasioned by the window 8 deteriorates, while that of the window 9 improves, whereupon the servo-operating device 15 will effect operation of the servo-motor 18 in a direction for moving the lens unit 1, 4 to the right until the proper focusing conditions and signal balance are obtained.

It will be apparent from the foregoing description that the camera tubes 2 and 6 need not necessarily be identical, the only requirement being that the tube 6 be sensitive to changes in focus of an optical image on its cathode to produce signal parameters which correspond to the degree of focus definition. In the proper arrangement, as the focus improves on the cathode of the tube 6, the amplitude of the signals corresponding to the fine image detail, in the two to four megacycle range derived from the tube will increase, and conversely, with deterioration of focus, the amplitude of the same frequency signals will diminish.

By following the teachings of the foregoing disclosure, it is possible to accomplish automatic focusing and image reproduction by utilizing only one camera tube in conjunction with a focus modulator having three different focus controlling windows, one of the windows providing perfect focus on the cathode, and the other two windows serving the same function as the windows 8 and 9 previously described. In this arrangement the picture signals would be obtained during the interposition of a window of proper focusing index, and the focusing control signals would be obtained during the alternate registration of the remaining two windows having suitable focus-interrupting or focus-controlling characteristics. In a television system, this focusing control could occur during the vertical blanking time.

As an alternative servo-mechanism, it is possible to feed the two signals produced by the rectifiers 13 and 14 to the two reversing field windings of the servo-motor whereby balanced signals will balance out in the servo-motor and unbalanced signals will drive the motor in a direction corresponding to the direction of unbalance. Other methods of utilizing the two signals corresponding respectively to the two focus-controlling conditions will occur to persons skilled in the art.

What is claimed is:

1. In an automatic focus adjusting system for television camera apparatus; a camera unit comprising a picture signal-generating camera and control signal generating camera, an optical lens system incorporating two lens members mounted to be moved as a unit and to focus optical images toward the respective photo-sensitive cathodes of said picture camera and said control camera, one lens member being positioned to focus an image accurately on the cathode of the picture camera, focus modulating means interposed between the other lens and the cathode of the control camera and operative to focus an image like the image of the first lens alternately on opposite sides of the control camera cathode, said modulating means comprising a motor-driven element in the light path of said other lens and said control camera cathode, said element serving the function of effecting the aforementioned alternating focus, means coupled to said control camera cathode for generating signals having parameters corresponding, respectively, to said alternating focus, distributing circuit means coupled to the last mentioned means and serving to separate the parameters corresponding to the respective alternating focusing conditions, said distributing means having two branch circuits and including an electrical switching device coupled to said motor-driven element in such a manner as to connect alternately said control camera output parameters to said branch circuits respectively, a comparison circuit connected to said branch circuits and serving to compare the separated parameters and to supply an output signal representative of the focused relationship between the two optical images directed toward said control camera cathode and as developed by said focus modulating means, and servo-motor means responsive to said output signal for adjusting said one lens member into focused relationship with said picture camera.

2. In an automatic focus adjusting system for television camera apparatus, a camera means comprising a picture signal-generating camera having a first photo-sensitive cathode, said camera incorporating a first lens which is adjustable to focus an optical image on said cathode, a control signal-generating camera operatively associated with said picture camera and having a second photo-sensitive cathode and a second lens adjustable with respect thereto, both said first and second lenses being mounted for simultaneous movement toward and away from the respective cathodes, a focus modulator interposed in the light path of the second lens and the second cathode and operative to focus the image projected by said second lens alternately in front and behind said second cathode, said control camera being operative to produce two different output signals having parameters corresponding, respectively, to the two optical images projected toward the second cathode, electronic signal comparison means coupled to said control camera, said electronic means being sensitive to the relationship of said parameters and supplying a control signal representative of the defocused relationship of the images directed toward said second cathode, and servo-motor means responsive to said control signal operatively coupled to said first and second lenses for adjusting the focus of the aforementioned optical image on said first cathode.

3. In an automatic focus adjusting system for television camera apparatus, a camera means comprising a picture signal-generating camera having a first photo-sensitive cathode, said camera incorporating a first lens which is adjustable to focus an optical image on said cathode, a control signal generating camera operatively associated with said picture camera and having a second photo-sensitive cathode and a second lens adjustable with respect thereto, both said first and second lenses being mounted for simultaneous movement toward and away from the respective cathodes, said control camera including a focus modulator interposed in the light path of the second lens and the second cathode and operative to focus the image projected by said second lens sequentially in front and behind said second cathode, said control camera being operative to produce two different output signals having amplitudes corresponding respectively to the two degrees of focus projected onto the second cathode, electronic signal comparison means coupled to control camera, said electronic means being sensitive to a difference in the two signal amplitudes to produce a control signal representative of the defocused relationship of the images directed toward said second cathode, and servo-motor means responsive to said control signal and operatively coupled to said first and second lenses for adjusting the focus of the aforementioned optical image on said first cathode.

4. In an automatic focus adjusting system for television camera apparatus, a camera means comprising a picture signal-generating camera having a first photo-sensitive cathode, said camera incorporating a first lens which is adjustable to focus an optical image on said cathode, a control signal-generating camera operatively associated with said picture camera and having a second photo-sensitive cathode and a second lens adjustable with respect thereto, both said first and second lenses being mounted for simultaneous movement toward and away from the respective cathodes, said control camera including a focus modulator interposed in the light path of the second lens and the second cathode and operative to focus the image projected by said second lens alternately in front of and behind said second cathode, so that said control camera produces two different output signals having parameters corresponding respectively to the two optical images projected toward the second cathode, electronic signal comparison means coupled to said control camera and also coupled to said modulator, the coupling between the modulator and the electronic means serving to synchronize the operation therebetween and to effect an output control signal representative of the defocused relationship of the images directed toward said second cathode, and servo-motor means responsive to said control signal operatively coupled to said first and second lenses.

5. In an automatic focus adjusting system for television camera apparatus, a camera means comprising a picture signal-generating camera having a first photo-sensitive cathode, said camera incorporating a first lens which is adjustable to focus an optical image on said cathode, a control signal-generating camera operatively associated with said picture camera and having a second photo-sensitive cathode and a second lens adjustable with respect thereto, both said first and second lenses being mounted for simultaneous movement toward and away from the respective cathodes, said control camera including a focus modulator interposed in the light path of the second lens and the second cathode and operative to cyclically focus the image projected by said second lens alternately in front and behind said second cathode, said control camera being operative to produce two different output signals having parameters corresponding respectively to the two optical images projected toward the second cathode, electronic signal comparison means coupled to said control camera to separate the aforesaid parameters into alternatley distinguishable signals, means to compare the separated signals to produce a control signal representative of the defocused relationship of the images directed toward said second cathode, and servo-motor means responsive to said control signal operatively coupled to said first and second lenses for adjusting the focus of the aforementioned optical image on said first cathode.

6. In an automatic focus adjusting system for television camera apparatus, a camera means comprising a picture signal-generating camera having a first photo-sensitive cathode, said camera incorporating a first lens which is adjustable to focus an optical image on said cathode, a control signal-generating camera operatively associated with said picture camera and having a second photo-sensitive cathode and a second lens adjustable with respect thereto, both said first and second lenses being mounted for simultaneous movement toward and away from the respective cathodes, said control camera including a focus modulator interposed in the light path of the second lens and the second cathode and operative to focus the image projected by said second lens alternately in front and behind said second cathode, said modulator comprising a rotatable disc having two windows of different optical characteristics which produce the aforementioned alternate focusing, said control camera being operative to produce two different output signals having mean frequencies corresponding respectively to the aforementioned alternating focus projected toward the second cathode, electronic signal comparison means coupled to the output of said control camera and including switch means operated by said rotatable disc, said switch means being operated by said disc in such a manner as to synchronize the alternate focusing with the operation of said switch means whereby said electronic comparison means will compare the aforesaid two signals corresponding to the alternate focusing, and means to produce a control signal representative of the defocused relationship of the alternating images, and servo-motor means responsive to said control signal operatively coupled to said first lens for adjusting the focus of the aforementioned optical image on said first cathode.

7. In an automatic focus adjusting system for television camera apparatus, a camera means comprising a picture signal-generating camera having a first photo-sensitive cathode, said camera incorporating a first lens which is adjustable to focus an optical image on said cathode, a control signal-generating camera operatively associated with said picture camera and having a second photo-sensitive cathode and a second lens adjustable with respect thereto, both said first and second lenses being mounted for simultaneous movement toward and away from the respective cathodes, said control camera including a focus modulator interposed in the light path of the second lens and the second cathode and operative to focus the image projected by said second lens alternately in front and behind said second cathode, said modulator comprising a rotatable disc having two windows of different refractive indices which produce the aforementioned alternate focusing, said windows being alternately registrable with the said light path to produce two different control camera output signals having parameters corresponding to the respective differing focusing conditions produced by said two windows, a dividing circuit operatively coupled to the output of said control camera and having two separate branches, an electrical switching device, said switching device having an operative connection with said rotatable disc to couple one of the aforementioned output signals to one of said branches when one of said windows is registered with said light path and to couple the other of said output signals to the other of said branches when the other of said windows is registered with said light path, said branches providing signal parameters corresponding to the focus relationship of the respective windows with respect to said said second cathode, and servo-motor means coupled to both of said branches and responsive to the difference in signal parameters thereof to control movement of said first lens with respect to said first cathode.

8. In an automatic focus adjusting system for picture camera apparatus, a camera means having a photo-sensitive element, said camera incorporating a first lens which is adjustable to focus an optical image on said element, a control signal-generating camera operatively associated with said picture camera and having a photo-sensitive cathode and a second lens adjustable with respect thereto, both said first and second lenses being mounted for simultaneous movement toward and away from the respective element and cathode, said control camera including a focus modulator interposed in the light path of the second lens and the cathode and operative to focus the image projected by said second lens alternately in front and behind said cathode, the cathode control camera being operative to produce two output signals of different mean frequencies representative of the fineness of deatil of the respective alternating images produced by said modulator, electronic signal comparison means coupled to said control camera, said electronic means including a filter responsive to said frequencies to produce signals representative of the defocused relationship of the images directed toward said cathode, and servo-motor means responsive to said signals operatively coupled to said first and second lenses for adjusting the focus of the aforementioned optical image on said element.

9. In an automatic focus adjusting system for camera apparatus, a camera means comprising a photo-sensitive element, said camera means incorporating a first lens which is adjustable to focus an optical image on said element, a control signal-generating camera operatively associated with said camera means and having a photo-sensitive cathode and a second lens adjustable with respect thereto, both said first and second lenses being mounted for simultaneous movement toward and away from the respective element and cathode, a focus modulator interposed in the light path between the second lens and said cathode for operatively focusing the image projected by said second lens sequentially in front and behind said second cathode, means coupled to the video signal output of said control camera to produce two different output signals having amplitudes representative, respectively, of the fine detail of the sequentially occurring images projected onto the cathode, electronic signal comparison means coupled to the last mentioned means, said electronic means being sensitive to a difference in said amplitudes to produce a control signal representative of the defocused relationship of the images directed toward said cathode, and servo-motor means responsive to said control signal and operatively coupled to said first and second lenses for adjusting the focus of the aforementioned optical image on said element.

10. In an automatic focus adjusting system for television camera apparatus; a camera unit comprising a picture signal-generating camera and a control signal-generating camera, the cameras having photo-sensitive elements respectively, an optical lens system incorporating two lens members mounted to be moved as a unit and to focus optical images toward the respective photo-sensitive elements of said cameras, one lens member being positioned to focus an image accurately on the element of the picture camera, focus modulating means interposed between the other lens and the element of the control camera and operative to focus an image like the image of the first lens alternately on opposite sides of the control camera element, filter means coupled to said control camera for generating two signals having amplitudes corresponding, respectively, to the two defocusing conditions produced by said modulating means, a comparison circuit connected to said filter means for comparing the amplitudes produced by the alternate focusing of said means and supplying an output signal representative of the focused relationship between the two images produced by said means, and servo-motor means responsive to said output signal for adjusting said optical lens system.

11. In an automatic focus adjusting system for camera apparatus; a camera unit comprising a picture camera and a control signal-generating camera having photo-sensitive elements, respectively, and optical lens system incorporating two lens members mounted to be moved as a unit and to focus optical images towards the respective photo-sensitive elements of said picture camera and said control camera, one lens member being positioned to focus an image accurately on the element of the picture camera, focus modulating means interposed between the other lens and said element of the control camera and operative to focus an image like the image of the first lens alternately on opposite sides of the control camera element, said modulating means comprising a rotatable disc having two differently refracting transparent windows which are alternately interposed in the light path between said other lens and said control camera element, said windows serving the function of effecting the aforementioned alternating focus, means coupled to the signal output of said control camera for generating signals having parameters corresponding, respectively, to the defocusing conditions produced by said windows, a comparison circuit connected to the last mentioned means and responsive to the parameters produced by the alternate focusing of said means and for supplying an output signal representative of the focused relationship between the two images, and servo-motor means responsive to said output signal for adjusting said lens system.

12. In an automatic focus adjusting system for television camera apparatus; a camera unit comprising a picture signal-generating camera and control signal-generating camera having photo-sensitive cathodes respectively, an optical lens system incorporating two lens members mounted to be moved as a unit and to focus optical images toward the respective photo-sensitive cathodes of said picture camera and said control camera, one lens member being adjustable to focus an image accurately on the cathode of the picture camera, focus modulating means associated with the other lens and operative to focus an image like the image of the first lens alternately on opposite sides of the control camera cathode, said modulating means comprising a rotatable disc having two different transparent windows which are sequentially interposed in the light path between said other lens and said control camera cathode, said windows serving the function of effecting the aforementioned alternating focus, means coupled to the control camera cathode for generating signals having parameters corresponding, respectively, to said alternating focus with respect to said control camera cathode, distributing circuit means coupled to said control camera and serving to separate the parameters corresponding to the respective alternating focusing conditions, a comparison circuit connected to said distributing circuit and serving to compare the separated parameters and to supply an output signal, and servo-motor means responsive to said output signal for adjusting said one lens member into focused relationship with said picture camera.

13. In an automatic focus adjusting system for television camera apparatus, a picture signal-generating camera having a first photo-sensitive cathode, said camera incorporating a first lens system which is adjustable to focus an optical image on said cathode, a control signal-generating camera operatively associated with said picture camera and having a second photo-sensitive cathode and a second lens system adjustable with respect thereto, the lenses of both of said first and second lens systems being mounted for simultaneous movement with respect to the respective cathodes, a focus modulator interposed in the light path of the second lens system and the second cathode and operative to successively focus the image projected by said second lens alternately in front and behind said second cathode, so that said control camera produces alternately two different signals having parameters corresponding to the respective differing focusing conditions produced by said modulator; a switching circuit coupled to said control camera, two separate rectifier circuits connected alternately to said control camera by means of the electrical switching device, said switching circuit and said modulator being synchronized so as to feed said two signals, respectively, to said two rectifiers, said rectifier circuits providing output voltages corresponding, respectively, with said two signals, and servo-motor means coupled to the outputs of both of said rectifier circuits and responsive to said signals to control movement of said first lens with respect to said first cathode.

References Cited in the file of this patent
UNITED STATES PATENTS

| | | |
|---|---|---|
| 2,134,757 | Goldsmith | Nov. 1, 1938 |
| 2,403,628 | Beers | July 9, 1946 |